US012654652B2

(12) United States Patent (10) Patent No.: US 12,654,652 B2
Yamamoto (45) Date of Patent: Jun. 16, 2026

(54) INFORMATION PROCESSING APPARATUS, INFORMATION PROCESSING METHOD, AND SYSTEM

(71) Applicant: TOYOTA JIDOSHA KABUSHIKI KAISHA, Toyota (JP)

(72) Inventor: Shinichi Yamamoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 18/456,898

(22) Filed: Aug. 28, 2023

(65) Prior Publication Data

US 2024/0101068 A1 Mar. 28, 2024

(30) Foreign Application Priority Data

Sep. 22, 2022 (JP) ................................. 2022-151545

(51) Int. Cl.
*B60R 25/33* (2013.01)
*B60R 25/24* (2013.01)
*G07C 9/00* (2020.01)
(52) U.S. Cl.
CPC .............. *B60R 25/33* (2013.01); *B60R 25/24* (2013.01); *G07C 9/00309* (2013.01); *B60R 2325/205* (2013.01); *G07C 2009/00793* (2013.01); *G07C 2209/63* (2013.01)
(58) Field of Classification Search
CPC ..................................................... B60R 25/33
See application file for complete search history.

(56) References Cited

U.S. PATENT DOCUMENTS

| | | | | |
|---|---|---|---|---|
| 11,615,370 B1* | 3/2023 | Li | .................... | G06Q 10/08355 |
| | | | | 705/338 |
| 2017/0369071 A1* | 12/2017 | Gould | ..................... | B60R 25/24 |
| 2018/0124213 A1* | 5/2018 | Wood | ..................... | H04L 47/50 |
| 2020/0097863 A1* | 3/2020 | Hiruta | .................... | G06Q 10/02 |
| 2020/0167702 A1* | 5/2020 | Beaurepaire | ....... | G01C 21/3438 |
| 2021/0331600 A1* | 10/2021 | Hishida | ................... | B60L 55/00 |
| 2022/0089147 A1 | 3/2022 | Ueno et al. | | |
| 2022/0391806 A1* | 12/2022 | Beaurepaire | ........... | G06T 17/05 |
| 2023/0117771 A1* | 4/2023 | Beaurepaire | ........... | G06V 20/58 |
| | | | | 382/104 |
| 2023/0316913 A1* | 10/2023 | Kubo | ..................... | G08G 1/123 |
| | | | | 340/989 |
| 2024/0067127 A1* | 2/2024 | Muto | .................... | B60R 25/305 |

FOREIGN PATENT DOCUMENTS

| | | |
|---|---|---|
| CN | 108551445 A | 9/2018 |
| CN | 114255610 A | 3/2022 |
| JP | 2017-027546 A | 2/2017 |

* cited by examiner

*Primary Examiner* — Travis R Hunnings
(74) *Attorney, Agent, or Firm* — Oliff PLC

(57) ABSTRACT

A controller is provided that is configured to perform: identifying a first user who is a user using a vehicle that is associated with a plurality of users; and transmitting, to a terminal of the first user, information about a parking position of the vehicle when the vehicle is parked, and not transmitting the information about the parking position of the vehicle to a terminal of a second user, who is a user other than the first user among the plurality of users.

17 Claims, 11 Drawing Sheets

| VEHICLE ID | VEHICLE POSITION | USER ID | USE USER |
|---|---|---|---|
| V001 | XXX | U001 | 1 |
|  |  | U002 | 0 |
|  |  | U003 | 0 |
|  |  | U004 | 0 |
| V002 | XXX | U005 | 1 |
|  |  | U006 | 1 |
|  |  | U007 | 0 |
|  |  | U008 | 0 |
| V003 | XXX | U009 | 0 |
|  |  | U010 | 1 |
|  |  | U011 | 0 |
|  |  | U012 | 0 |

FIG. 4

INFORMATION PROCESSING APPARATUS, INFORMATION PROCESSING METHOD, AND SYSTEM

CROSS REFERENCE TO THE RELATED APPLICATION

This application claims the benefit of Japanese Patent Application No. 2022-151545, filed on Sep. 22, 2022, which is hereby incorporated by reference herein in its entirety.

BACKGROUND

Technical Field

The present disclosure relates to an information processing apparatus, an information processing method, and a system.

Description of the Related Art

There is known a technology in which guidance is provided from the current position of a mobile terminal carried by a user of a vehicle to the parking position of the vehicle based on the vehicle parking information obtained from a management server (for example, Patent Literature 1).

CITATION LIST

Patent Literature

Patent Literature 1: Japanese Patent Application Laid-Open Publication No. 2017-027546

SUMMARY

An object of the present disclosure is to appropriately provide information about a parking position of a vehicle.

One aspect of the present disclosure is directed to an information processing apparatus including a controller configured to perform:

identifying a first user who is a user using a vehicle that is associated with a plurality of users; and transmitting, to a terminal of the first user, information about a parking position of the vehicle when the vehicle is parked, and not transmitting the information about the parking position of the vehicle to a terminal of a second user, who is a user other than the first user among the plurality of users.

Another aspect of the present disclosure is directed to an information processing method for causing a computer to perform:

identifying a first user who is a user using a vehicle that is associated with a plurality of users; and transmitting, to a terminal of the first user, information about a parking position of the vehicle when the vehicle is parked, and not transmitting the information about the parking position of the vehicle to a terminal of a second user, who is a user other than the first user among the plurality of users.

A further aspect of the present disclosure is directed to a system comprising:

a server;

a vehicle associated with a plurality of users; and a terminal associated with each of the plurality of users; wherein the server includes a controller configured to perform:

identifying a first user, which is a user using the vehicle, based on information transmitted from the vehicle to the server; and transmitting, to a terminal of the first user, information about a parking position of the vehicle when the vehicle is parked, and not transmitting the information about the parking position of the vehicle to a terminal of a second user, who is a user other than the first user among the plurality of users.

In addition, a still further aspect of the present disclosure is directed to a program for causing a computer to perform processing in the above-described information processing apparatus, or a storage medium storing the program in a non-transitory manner.

According to the present disclosure, it is possible to appropriately provide information about a parking position of a vehicle.

BRIEF DESCRIPTION OF THE DRAWINGS

FIG. 4 is a view illustrating an example of a table configuration of a vehicle information database (DB);

DESCRIPTION OF THE EMBODIMENTS

Figure 1:
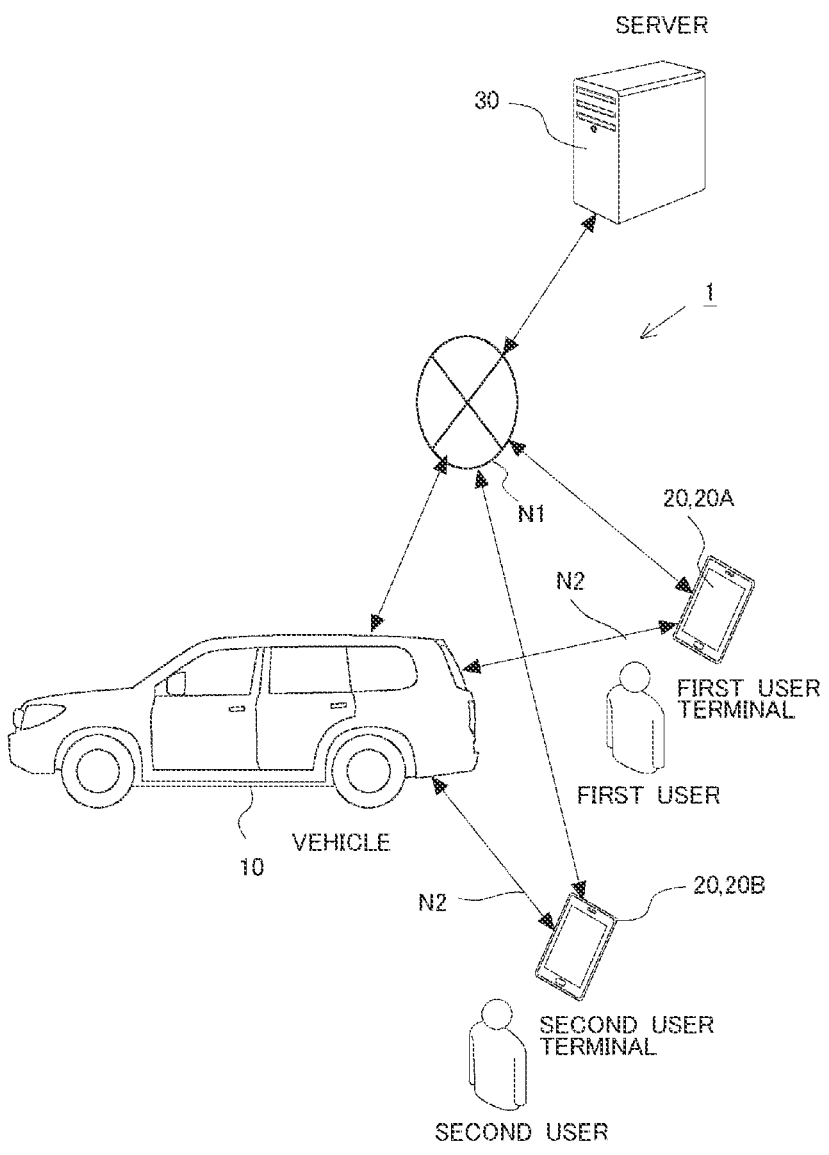
FIG. 1 is a view illustrating a schematic configuration of a system according to a first embodiment.

An information processing apparatus, which is one aspect of the present disclosure, includes a controller. The controller is configured to perform: identifying a first user who is a user using a vehicle that is associated with a plurality of users; and transmitting, to a terminal of the first user, information about a parking position of the vehicle when the vehicle is parked, and not transmitting the information about the parking position of the vehicle to a terminal of a second user, who is a user other than the first user among the plurality of users.

The vehicle is a vehicle that is shared by a plurality of users. This vehicle can be, by way of example, a vehicle used by a family, a vehicle used in car sharing, a company vehicle, or the like. In such a vehicle to be shared by a plurality of users in this manner, there can be considered a service that informs the users of the parking location of the vehicle. For example, it is conceivable that the position or location where the vehicle has been parked may be displayed on a terminal of a user in response to a request from the user. By using this service, it becomes easier to find the vehicle of the user in a wide parking lot, for example. On the other hand, if the parking position of the vehicle is notified to all the users who share the same vehicle, all the users will know where the user currently using the vehicle has parked, so there is a concern that the privacy of the user will be infringed.

Therefore, the controller identifies a first user who is using the vehicle. The first user may be a user who is driving the vehicle or a user (fellow passenger) who is riding in the vehicle. In addition, the first user may be, for example, a user who was in the vehicle immediately before the vehicle was parked. The first user may be identified, for example, by using information about the user registered in a smart key for the vehicle, or based on the status of communication between the terminal of the user and the vehicle.

Further, the controller transmits information about the parking position of the vehicle to the terminal of the first user when the vehicle is parked. The controller may transmit, for example, information about the parking position in response to a request from the terminal of the first user. On the other hand, the controller does not transmit information about the parking position of the vehicle to the terminal of the second user. The second user is a user who shares the vehicle but is not currently using the vehicle. For example, even if a request is made from the terminal of the second user, the controller does not transmit information about the parking position. In this way, it is possible to suppress the second user from knowing the position where the first user has parked.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

FIG. 1 is a view illustrating a schematic configuration of a system 1 according to a first embodiment. The system 1 is a system that allows a plurality of users to use the same vehicle 10, and provides the position information of the vehicle 10 to a user who is currently using the vehicle 10, and does not provide the position information of the vehicle 10 to the other users. The provision of the position information of the vehicle 10 is performed, for example, by a server 30 in response to a request from a user terminal 20.

In the example of FIG. 1, the system 1 includes the vehicle 10, the user terminal 20 and the server 30. The user terminal 20 is a mobile terminal that is owned or carried by a user. In addition, the vehicle 10 is a vehicle associated with the user terminal 20. A plurality of user terminals 20 are also associated with the vehicle 10. The vehicle 10 is a vehicle used by a plurality of users such as, for example, a family car used by a family, a vehicle used for car sharing, a company vehicle or the like.

The vehicle 10, the user terminal 20 and the server 30 are mutually connected to one another by means of a network N1. Here, note that the network N1 is, for example, a worldwide public communication network such as the Internet or the like, and a WAN (Wide Area Network) or other communication networks may be adopted. Also, the network N1 may include a telephone communication network such as a mobile phone network or the like, and/or a wireless communication network such as Wi-Fi (registered trademark) or the like. Further, the vehicle 10 is connected to the user terminal 20 via a network N2 including short-range wireless communication or the like. FIG. 1 illustrates one vehicle 10 by way of example, but there can be a plurality of vehicles 10. Furthermore, a plurality of vehicles 10 are each associated with a plurality of users and user terminals 20. Note that in FIG. 1, a user currently using the vehicle 10 is referred to as a first user, and a user terminal 20 possessed by the first user is referred to as a first user terminal 20A. Also, a user who is not using the vehicle 10 at the current time is referred to as a second user, and a user terminal 20 possessed by the second user is referred to as a second user terminal 20B. Hereinafter, in cases where the first user terminal 20A and the second user terminal 20B are not distinguished from each other, they are each simply referred to as a user terminal 20. Also, in cases where the first user and the second user are not distinguished from each other, they are each simply referred to as a user.

Figure 2:
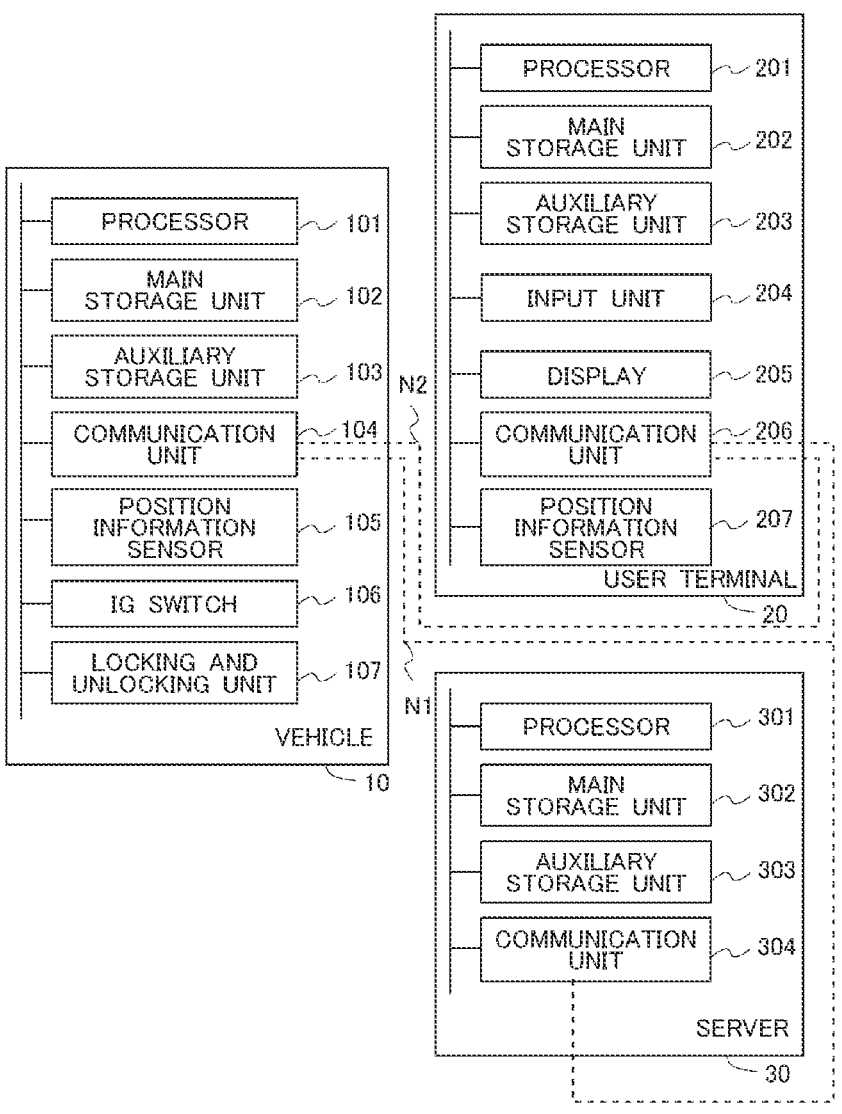
FIG. 2 is a block diagram schematically illustrating an example of a configuration of each of a vehicle, a user terminal and a server, which together constitute the system according to the first embodiment.

Hardware configurations of the vehicle 10, the user terminal 20, and the server 30 will be described based on FIG. 2. FIG. 2 is a block diagram schematically illustrating an example of a configuration of each of the vehicle 10, the user terminal 20 and the server 30, which together constitute the system 1 according to the present embodiment.

The server 30 has a configuration of a computer. The server 30 includes a processor 301, a main storage unit 302, an auxiliary storage unit 303, and a communication unit 304. These components are mutually connected to one another by means of a bus. Note that the processor 301 is an example of a controller.

The processor 301 is a CPU (Central Processing Unit), a DSP (Digital Signal Processor), or the like. The processor 301 controls the server 30 thereby to perform various information processing operations. The main storage unit 302 is a RAM (Random Access Memory), a ROM (Read Only Memory), or the like. The auxiliary storage unit 303 is an EPROM (Erasable Programmable ROM), a hard disk drive (HDD), a removable medium, or the like. The auxiliary storage unit 303 stores an operating system (OS), various programs, various tables, and the like. The processor 301 loads a program stored in the auxiliary storage unit 303 into a work area of the main storage unit 302 and executes the program, so that each component or the like is controlled through the execution of the program. As a result, the server 30 realizes functions that match predetermined purposes. The main storage unit 302 and the auxiliary storage unit 303 are computer readable recording media. Here, note that the server 30 may be a single computer or a plurality of computers that cooperate with one another. In addition, the information stored in the auxiliary storage unit 303 may be stored in the main storage unit 302. Also, the information stored in the main storage unit 302 may be stored in the auxiliary storage unit 303.

The communication unit 304 is a means or unit that communicates with the vehicle 10 and the user terminal 20 via the network N1. The communication unit 304 is, for example, a LAN (Local Area Network) interface board, a wireless communication circuit for wireless communication, or the like. The LAN interface board or the wireless communication circuit is connected to the network N1.

Here, note that a series of processing executed by the server 30 can be executed by hardware, but can also be executed by software.

Now, the user terminal 20 will be described. The user terminal 20 is, for example, a smart phone, a mobile phone, a tablet terminal, a personal information terminal, a wearable computer (such as a smart watch or the like), or a small computer such as a personal computer (PC). The user terminal 20 includes a processor 201, a main storage unit 202, an auxiliary storage unit 203, an input unit 204, a display 205, a communication unit 206, and a position information sensor 207. These components are mutually connected to one another by means of a bus. The processor 201, the main storage unit 202 and the auxiliary storage unit 203 are the same as the processor 301, the main storage unit 302 and the auxiliary storage unit 303 of the server 30, respectively, and hence, the description thereof will be omitted.

The input unit 204 is a means or unit that receives an input operation performed by the user, and is, for example, a touch panel, a mouse, a keyboard, a push button, or the like. The display 205 is a means or unit that presents information to the user, and is, for example, an LCD (Liquid Crystal Display), an EL (Electroluminescence) panel, or the like. The input unit 204 and the display 205 may be configured as a single touch panel display.

The communication unit 206 is a communication means or unit for connecting the user terminal 20 to the network N1 or the network N2. The communication unit 206 is a circuit for communicating with another device (e.g., the vehicle 10, the server 30 or the like) via the network N1 or the network N2 by making use of a mobile communication service (e.g., a telephone communication network such as 6G (6th Generation), 5G (5th Generation), 4G (4th Generation), 3G (3rd Generation), LTE (Long Term Evolution) or the like), and/or a wireless communication network such as Wi-Fi (registered trademark), Bluetooth (registered trademark), NFC (Near Field Communication), UWB (Ultra Wideband) or the like.

The position information sensor 207 obtains position information (e.g., latitude and longitude) of the user terminal 20. The position information sensor 207 is, for example, a GPS (Global Positioning System) receiver unit, a wireless LAN communication unit, or the like.

Next, the vehicle 10 will be described. The vehicle 10 includes a processor 101, a main storage unit 102, an auxiliary storage unit 103, a communication unit 104, a position information sensor 105, an ignition (IG) switch 106, and a locking and unlocking unit 107. These components are mutually connected to one another by means of a bus. The processor 101, the main storage unit 102, the auxiliary storage unit 103, the communication unit 104, and the position information sensor 105 are the same as the processor 201, the main storage unit 202, the auxiliary storage unit 203, the communication unit 206, and the position information sensor 207 of the user terminal 20, respectively, and hence, the description thereof will be omitted.

The IG switch 106 is a switch for starting the vehicle 10 or stopping the function of the vehicle 10 when pressed by the user. This IG switch 106 may be a switch for starting the engine of the vehicle 10. In addition, in the case of an electric vehicle or a hybrid vehicle, a power switch may be provided as an alternative method. This power switch is also a switch for starting the vehicle 10 or stopping the function of the vehicle 10 when pressed by the user. The locking and unlocking unit 107 serves to lock and unlock the doors of the vehicle 10.

Figure 3:
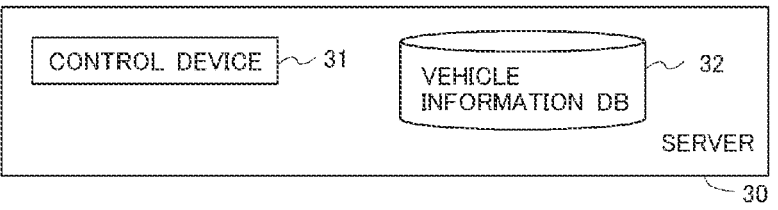
FIG. 3 is a diagram illustrating an example of a functional configuration of the server.

Then, the functions of the server 30 will be described. FIG. 3 is a diagram illustrating an example of a functional configuration of the server 30. The server 30 includes, as its functional components, a control device 31 and a vehicle information DB 32. The processor 301 of the server 30 executes the processing of the control device 31 by means of a computer program on the main storage unit 302.

The vehicle information DB 32 is built by a program of a database management system (DBMS) that is executed by the processor 301 to manage data stored in the auxiliary storage unit 303. The vehicle information DB 32 is, for example, a relational database.

The control device 31 obtains information about the vehicle 10 (hereinafter also referred to as vehicle information). The vehicle information includes information about the user using the vehicle 10 at the current time point and the position information of the vehicle 10. When obtaining the vehicle information, the control device 31 stores it in the vehicle information DB 32. FIG. 4 is a view illustrating an example of a table configuration of the vehicle information DB 32. The vehicle information table has fields for vehicle ID, vehicle position, user ID, and use user. In the vehicle ID field, information that can identify each vehicle (vehicle ID) is entered. A vehicle ID has been assigned to each vehicle 10 in advance. In the vehicle position field, information about the position of each vehicle 10 is entered. The position information of each vehicle 10 may be transmitted from the vehicle 10 at predetermined time intervals, or may be transmitted from the vehicle 10 at the time when the vehicle 10 is parked. In the user ID field, information (user ID) that can identify the user associated with each vehicle 10 is entered. A user ID is assigned, for example, at the time of the registration of each user. A user ID is assigned to each user who can use each vehicle 10.

In the use user field, information that can identify a user (i.e., a first user) using the vehicle 10 and a user (i.e., a second user) not using the vehicle 10 is entered. For example, "1" is entered in the use user field corresponding to the user using the vehicle 10, and "0" is entered in the use user field corresponding to the user not using the vehicle 10. For example, in the example illustrated in FIG. 4, a user currently using a vehicle 10 with a vehicle ID of V001 is a user with a user ID of U001. In addition, for example, users currently using a vehicle 10 with a vehicle ID of V002 are users with user IDs of U005 and U006. In this case, for example, one user is a driver and the other user is a fellow passenger.

The control device 31 determines which of the users associated with the vehicle 10 is the first user and which is the second user. The control device 31 can identify the first user by obtaining information about an electronic key 21A present in the vehicle, for example, by using the function of a smart key 11A to be described later. Note that the first user identified by the server 30 is, for example, the user who is using the vehicle 10 immediately before the IG switch 106 of the vehicle 10 is turned off. Therefore, the control device 31 identifies, as the first user, the user associated with the electronic key 21A present in the vehicle before the function of the vehicle 10 is stopped (i.e., shut down).

Here, note that, as an alternative, for example, the vehicle 10 and the user terminal 20 may perform short-range wireless communication via the network N2 to obtain the user ID associated with the user terminal 20, which is present in the vehicle, and transmit the user ID to the server 30. In this case, for example, a navigation system or an audio system of the vehicle 10 may perform short-range wireless communication with the user terminal 20, so that the vehicle 10 may obtain the user ID from the user terminal 20. Further, as another alternative, the position information of the vehicle 10 and the position information of the user terminal 20 may be obtained, and if both exist at the same position, the user associated with the user terminal 20 may be determined to be the first user using the vehicle 10.

In addition, when the vehicle 10 is in a parking state, the control device 31 transmits information about the parking position of the vehicle 10 to the first user terminal 20A in response to a request from the first user terminal 20A. Whether or not the vehicle 10 is in a parking state is determined according to whether or not the vehicle 10 was shut down. Here, immediately before the vehicle 10 is shut down, information about the shutdown is transmitted from the vehicle 10 to the server 30. At this time, the vehicle information is also transmitted.

Moreover, immediately after the vehicle 10 was started, information about the starting of the vehicle 10 is transmitted from the vehicle 10 to the server 30. When the vehicle 10 is started, the user ID of the user who started the vehicle 10 is obtained by the vehicle 10, and this user ID is also transmitted to the server 30 together with the information about the vehicle starting. Therefore, the control device 31 can determine that the vehicle 10 is in the parking state during a period of time from the shutdown to the starting of the vehicle 10.

When receiving a request for position information of the vehicle 10 from the user terminal 20, the control device 31 determines whether or not the user terminal 20 is the first user terminal 20A. Then, in cases where it is determined that the user terminal 20 is the first user terminal 20A, the position information of the vehicle 10 is transmitted to the first user terminal 20A.

Figure 5:
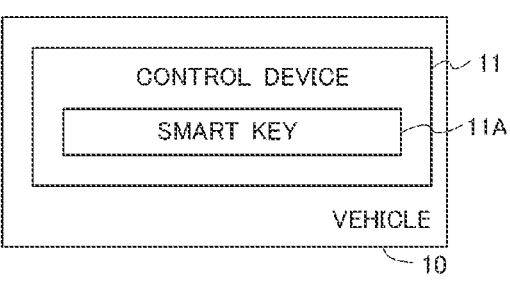
FIG. 5 is a view illustrating an example of a functional configuration of the vehicle.

Now, the function of the vehicle 10 will be described. FIG. 5 is a view illustrating an example of a functional configuration of the vehicle 10. The vehicle 10 includes a control device 11 as its functional component. The processor 101 of the vehicle 10 executes the processing of the control device 11 by means of a computer program on the main storage unit 102. However, a part of the processing of the control device 11 may be executed by a hardware circuit.

The control device 11 has the function of the smart key 11A that locks and unlocks the doors of the vehicle 10 by operating the locking and unlocking unit 107 based on a signal from the user terminal 20. The control device 11 performs short-range wireless communication with the electronic key 21A, which will be described later, by making use of the function of the smart key 11A.

In addition, when the vehicle 10 is shut down, the control device 11 transmits the position information and the information about the electronic key 21A to the server 30. The time when the vehicle 10 is shut down is, for example, when the IG switch 106 is turned off. The information about the electronic key 21A includes information that can identify the electronic key 21A. The information that can identify the electronic key 21A may be information that can identify the user or information that can identify the user terminal 20. For example, a user ID is associated with the electronic key 21A, and the control device 11 transmits the user ID to the server 30 when the vehicle 10 is shut down. As a result, the server 30 can identify the user who was using the vehicle 10 when the vehicle 10 was parked. Here, note that the transmission of these pieces of information may be performed in response to a request from the server 30.

Figure 6:
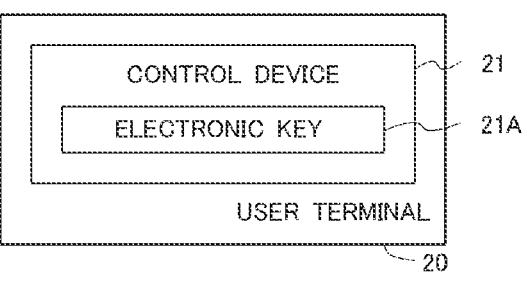
FIG. 6 is a diagram illustrating an example of a functional configuration of the user terminal.

Next, the function of the user terminal 20 will be described. FIG. 6 is a diagram illustrating an example of a functional configuration of the user terminal 20. The user terminal 20 includes a control device 21 as its functional component. The processor 201 of the user terminal 20 executes the processing of the control device 21 by a computer program on the main storage unit 202. However, a part of the processing of the control device 21 may be executed by a hardware circuit. The control device 21 has the function of the electronic key 21A for a smart key system. Here, note that, as an alternative, the user may have a terminal having an electronic key function in addition to the user terminal 20. The control device 21 (i.e., the electronic key 21A) establishes communication with the smart key 11A of the vehicle 10 to lock and unlock the vehicle 10. The smart key 11A is used for driving the vehicle 10.

In addition, the control device 21 transmits a position confirmation request to the server 30. For example, when the input unit 204 receives an input to activate application software for confirming the position of the vehicle 10 (i.e., when an icon for the application software displayed on the display 205 is tapped), the control device 21 transmits to the server 30 a position confirmation request, which is a request for confirming the parking position of the vehicle 10. The position confirmation request includes a user ID.

Also, upon receiving information about the parking position of the vehicle 10 from the server 30, the control device 21 causes the display 205 to show an image corresponding to the parking position of vehicle 10. The display 205 shows, for example, an image of the position of the vehicle 10 on a map with an icon.

Figure 7:
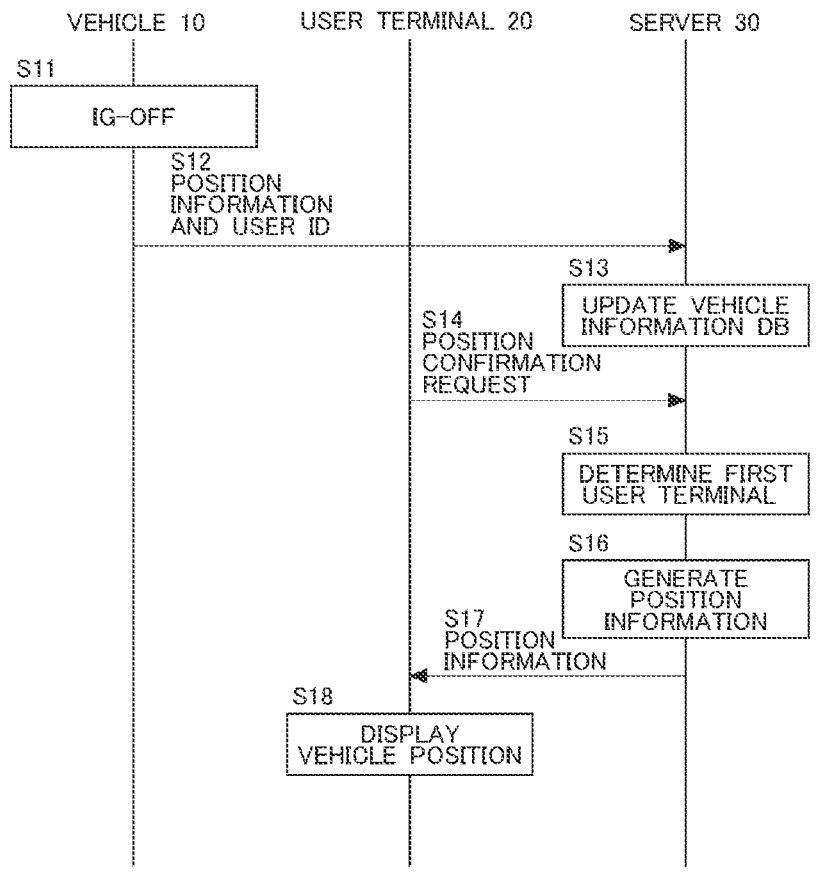
FIG. 7 is a sequence diagram illustrating the overall processing of the system.

Then, the processing of the system 1 as a whole will be described. FIG. 7 is a sequence diagram illustrating the overall processing of the system 1. The vehicle 10 and the user terminal 20 illustrated in FIG. 7 have been associated with each other in advance and registered in the server 30. When the user turns off the IG switch 106 in the vehicle 10 (S11), the vehicle 10 is shut down. The vehicle 10 obtains position information by the position information sensor 105 immediately before shutting down, further obtains a user ID from the user terminal 20 present in the vehicle, and transmits the user ID to the server 30 (S12). This information is stored in the vehicle information DB 32 at the server 30, thereby updating the vehicle information DB 32 (S13). Thereafter, upon receiving a position confirmation request from the user terminal 20 (S14), the server 30 determines whether or not the user terminal 20 that has transmitted the position confirmation request is the first user terminal 20A (S15). The server 30 determines, based on the user ID included in the position confirmation request and the information stored in the vehicle information DB 32, whether or not the user terminal 20 to which the position confirmation information has been transmitted is the first user terminal 20A. When determining that the user terminal 20 is the first user terminal 20A, the server 30 generates position information of the vehicle 10 (S16), and transmits the position information to the user terminal 20 (S17). At the user terminal 20 that has received the position information, the position of the vehicle 10 is displayed on the display 205 (S18).

Figure 8:
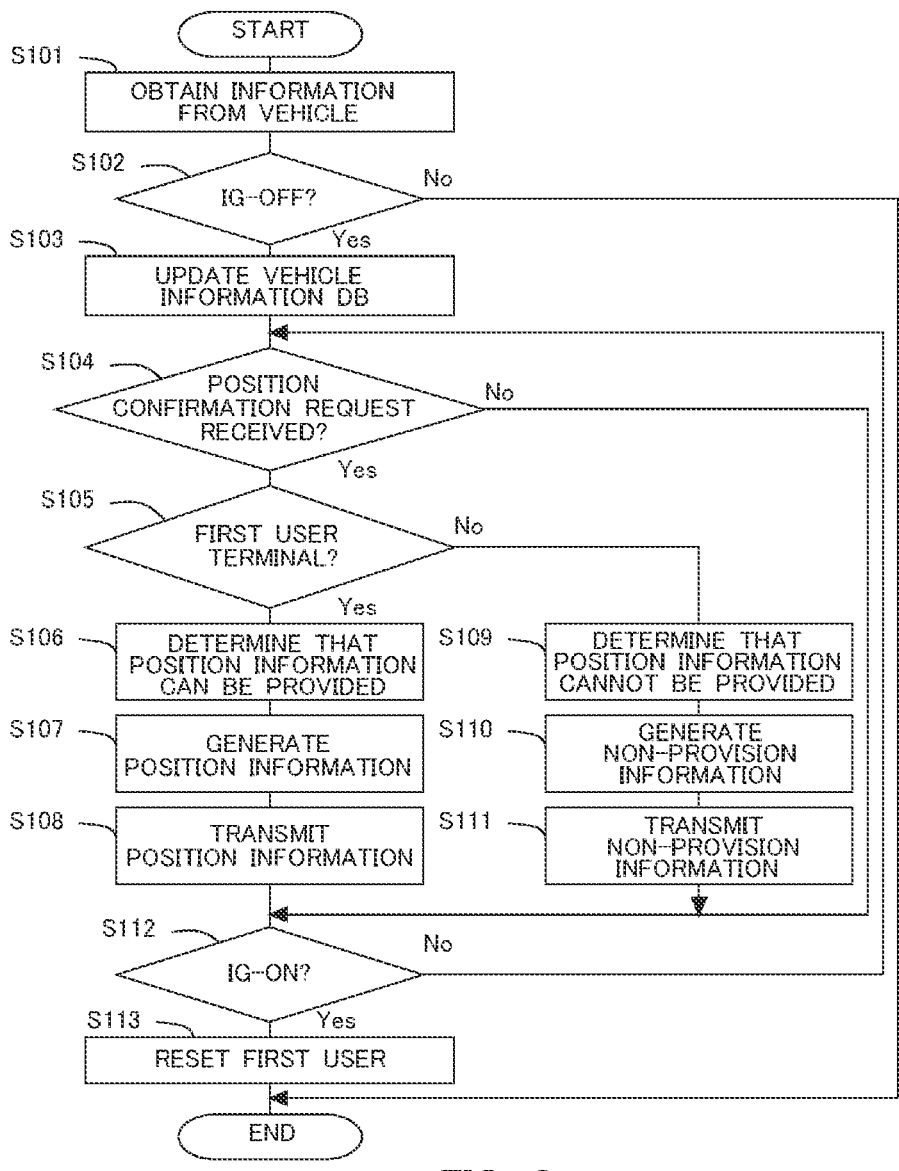
FIG. 8 is a flowchart of the processing of the server according to the first embodiment.

Now, the processing in the server 30 will be described. FIG. 8 is a flowchart of the processing of the server 30 according to the present embodiment. The processing illustrated in FIG. 8 is repeatedly executed at the server 30 for each vehicle 10 at predetermined time intervals. Here, note that the following explanation will be made on the assumption that necessary information has been stored in the vehicle information DB 32.

In step S101, the control device 31 obtains information from the vehicle 10. The information obtained at this time includes information about the starting state of the vehicle 10, the position information thereof, and the user ID of the user riding in the vehicle 10. In step S102, the control device 31 determines whether or not the IG switch 106 has been turned off. That is, it is determined whether or not the information was transmitted when the vehicle 10 was shut down. When an affirmative determination is made in step S102, the processing or routine proceeds to step S103, whereas when a negative determination is made, this routine is ended.

In step S103, the control device 31 updates the vehicle information DB 32. The control device 31 enters 1 in the use user field corresponding to the user ID of the user using the vehicle among the records corresponding to the vehicle ID included in the information obtained from the vehicle 10, and enters 0 in the fields of the other users. Also, the position information of the vehicle 10 is entered in the vehicle position field among the records corresponding to the vehicle ID.

In step S104, the control device 31 determines whether or not a position confirmation request has been received from the user terminal 20. When an affirmative determination is made in step S104, the processing proceeds to step S105, whereas when a negative determination is made, the processing proceeds to step S112. In step S105, the control device 31 determines whether or not the user terminal 20 that has transmitted the position confirmation request is the first user terminal 20A. The control device 31 determines whether or not "1" is entered in the user field of the vehicle information DB 32 corresponding to the user ID included in the position confirmation request. When an affirmative determination is made in step S105, the processing proceeds to step S106, whereas when a negative determination is made, the processing proceeds to step S109.

In step S106, the control device 31 determines that the position information can be provided to the user who has transmitted the position confirmation request. That is, it is determined that the first user has transmitted the position confirmation request from the first user terminal 20A. As a result, the user is identified as the first user. Then, in step S107, the control device 31 generates position information of the vehicle 10. The information stored in the vehicle information DB 32 is used as the position information of the vehicle 10. Further, in step S108, the control device 31 transmits the position information thus generated to the user terminal 20 (first user terminal 20A) that has transmitted the position confirmation request. This position information may include a command or instruction to represent the position of the vehicle 10 on a map.

On the other hand, in step S109, the control device 31 determines that the position information cannot be provided to the user who has transmitted the position confirmation request. That is, it is determined that the second user has transmitted the position confirmation request from the second user terminal 20B. Then, in step S110, the control device 31 generates non-provision information. The non-provision information is information for notifying the user that the position of the vehicle 10 cannot be provided. Further, in step S111, the control device 31 transmits the non-provision information thus generated to the user terminal 20 (second user terminal 20B) that has transmitted the position confirmation request. This non-provision information may include a command or instruction to display on the display 205 of the user terminal 20 that the position information of the vehicle 10 cannot be provided.

In step S112, the control device 31 determines whether or not the IG switch 106 is turned on. When the IG switch 106 is turned on, information about the IG switch 106 being turned on is transmitted from the vehicle 10 to the server 30. This information may include the user ID corresponding to the user terminal 20 present in the vehicle at this time. When an affirmative determination is made in step S112, the processing proceeds to step S113, whereas when a negative determination is made, the processing returns to step S104.

In step S113, the control device 31 resets the use user field entered in the vehicle information DB 32. That is, "0" is entered in the use user field corresponding to each user. Note that at this time, "1" may be entered in the use user field corresponding to the user terminal 20 present in the vehicle.

Figure 9:
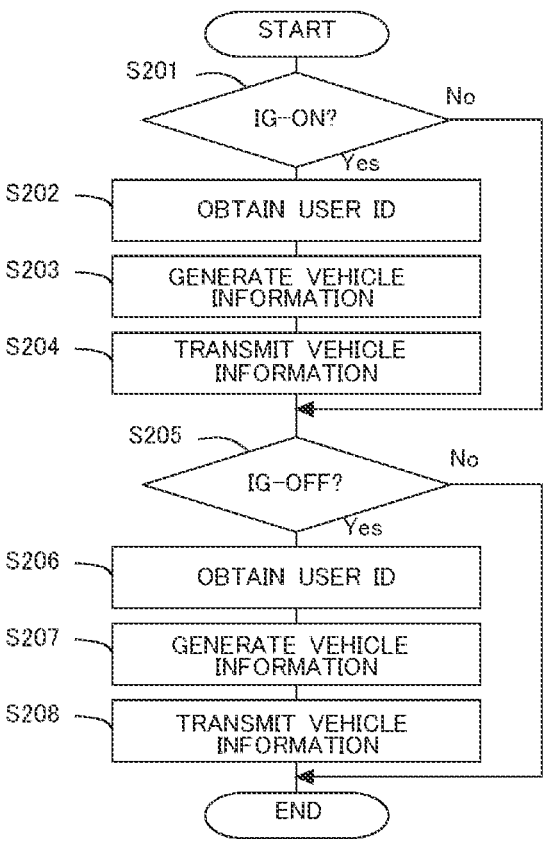
FIG. 9 is a flowchart of the processing of the vehicle according to the first embodiment.

Next, the processing in the vehicle 10 will be described. FIG. 9 is a flowchart of the processing of the vehicle 10 according to the present embodiment. The processing illustrated in FIG. 9 is repeatedly executed at predetermined time intervals in the vehicle 10.

In step S201, the control device 11 determines whether or not the IG switch 106 has changed from OFF to ON. When an affirmative determination is made in step S201, the processing proceeds to step S202, whereas when a negative determination is made, the processing proceeds to step S205. In step S202, the control device 11 obtains the user ID of the user present in the vehicle. The control device 11 obtains a user ID associated with a user terminal 20 used to unlock the vehicle 10 or a user ID associated with a user terminal 20 used to turn on the IG switch 106. Note that, as an alternative, the user ID may be obtained from the user terminal 20 present in the vehicle by performing short-range wireless communication with the user terminal 20 via the network N2.

In step S203, the control device 11 generates information about the vehicle 10. Here, the information is generated that includes information about the IG switch having been turned on and information about the user ID obtained in step S202. Then, in step S204, the control device 11 transmits the information about the vehicle 10 generated in step S203 to the server 30.

In step S205, the control device 11 determines whether or not the IG switch 106 has changed from ON to OFF. When an affirmative determination is made in step S205, the processing or routine proceeds to step S206, whereas when a negative determination is made, this routine is ended. In step S206, the control device 11 obtains the user ID of the user present in the vehicle. At this time, the user ID obtained in step S202 may be used. Note that, as an alternative, the control device 11 may obtain the user ID from the user terminal 20 present in the vehicle by performing short-range wireless communication with the user terminal 20 via the network N2.

In step S207, the control device 11 generates information about the vehicle 10. Here, the information is generated that includes information about the IG switch having been turned off, position information, and the user ID. Then, in step S208, the control device 11 transmits the information about the vehicle 10 generated in step S207 to the server 30.

Figure 10:
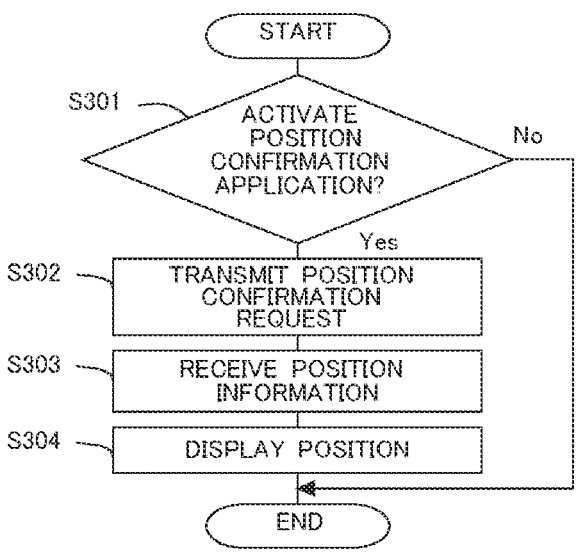
FIG. 10 is a flowchart of the processing of the user terminal according to the first embodiment.

Then, the processing of the user terminal 20 will be described. FIG. 10 is a flowchart of the processing of the user terminal 20 according to the present embodiment. The processing illustrated in FIG. 10 is repeatedly executed at predetermined time intervals in the user terminal 20. Here, note that the following description will be made on the assumption that the user has parked the vehicle 10 and is in a position away from the vehicle 10.

In step S301, the control device 21 determines whether or not application software for confirming the position of the vehicle 10 has been activated by the user. When the user taps a predetermined icon displayed on the display 205, the application software for confirming the position of vehicle 10 is activated. When an affirmative determination is made in step S301, the processing or routine proceeds to step S302, whereas when a negative determination is made, this routine is ended.

In step S302, the control device 21 transmits a position confirmation request to the server 30. This position confirmation request includes a user ID. In step S303, the control device 21 receives position information from the server 30. This position information may include information for displaying the position of the vehicle 10 on the display 205. In addition, the position information may include information representing the position of the vehicle 10 in latitude and longitude. In step S304, the control device 21 causes the display 205 to display an image corresponding to the position of the vehicle 10. Here, note that a route to the parking position of the vehicle 10 may be displayed. This route may be generated by the server 30 or by the user terminal 20.

As described above, according to the present embodiment, it is possible to notify only the current user of the position information of the vehicle 10 that can be used by a plurality of users. Therefore, it is possible to suppress the other users from knowing where the current user went out in the vehicle 10. This allows for the protection of privacy.

Here, note that in the above-described embodiment, the user using the vehicle 10 is identified by communication between the electronic key 21A and the smart key 11A, but the present invention is not limited to this. For example, the vehicle 10 may obtain information from the user terminal 20 when the navigation system or audio system of the vehicle 10 and the user terminal 20 perform short-range wireless communication. In this case, too, the user associated with the user terminal 20 that was connected to the navigation or audio system at the time when the IG switch 106 was turned off is identified as the first user using the vehicle 10. In addition to the driver, fellow passengers in the vehicle can also be identified in the same way.

In addition, in the above-described embodiment, the user terminal 20 has the function of the electronic key 21A and the function of confirming the parking position, but these functions may be provided by separate terminals.

Further, in the above-described embodiment, the position information and the user ID are transmitted from the vehicle 10 at the time of shutdown of the vehicle 10, but the present invention is not limited to this, and the position information and the user ID may be transmitted from the vehicle 10 at predetermined time intervals. In this case, upon receiving the information about the shutdown from the vehicle 10, the control device 31 identifies the position of the vehicle 10 and the first user based on the latest position information and user ID transmitted from the vehicle 10.

Similarly, the control device 31 may identify the first user on the assumption that the user who was present in the vehicle at the time of starting the vehicle 10 will also be present in the vehicle at the subsequent shutdown. For example, it is assumed that the user associated with an electronic key used to unlock the doors or an electronic key used to start the vehicle 10 is driving the vehicle 10 until the time of shutdown of the vehicle 10. Then, the user associated with the electronic key used to unlock the doors or the electronic key used to start the vehicle 10 is identified as the first user.

Second Embodiment

In the first embodiment, the position information of the vehicle 10 is provided only to the first user, but in a second embodiment, the position information of the vehicle 10 is also provided to the second user depending on a condition. The condition referred to herein is, for example, when the vehicle 10 exists within a predetermined distance (within a predetermined range) from the user terminal 20, or when the vehicle 10 is a company vehicle and the vehicle 10 exists within a predetermined distance (within a predetermined range) from the position of its company. In this case, the position information of the vehicle 10 is provided to the second user in response to receiving a location confirmation request from the second user terminal 20B.

Figure 11:
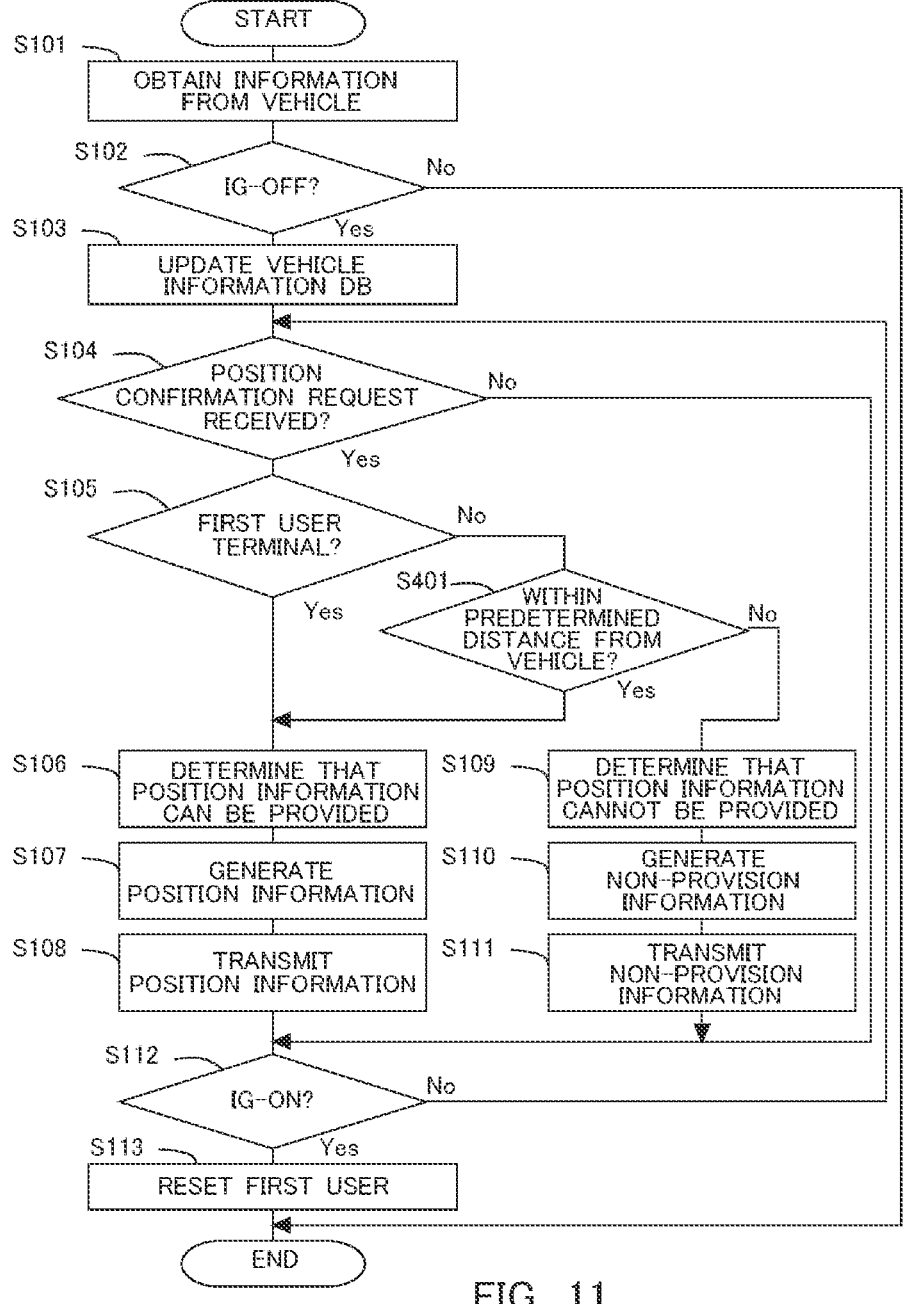
FIG. 11 is a flowchart of the processing of the server according to a second embodiment.

Next, the processing in the server 30 will be described. FIG. 11 is a flowchart of the processing of the server 30 according to the second embodiment. The processing illustrated in FIG. 11 is repeatedly executed at the server 30 for each vehicle 10 at predetermined time intervals. Here, note that the following explanation will be made on the assumption that necessary information has been stored in the vehicle information DB 32. In addition, in FIG. 11, the steps in which the same processing is performed as in the routine illustrated in FIG. 8 are denoted by the same reference signs, and the description thereof will be omitted.

In the routine illustrated in FIG. 11, when a negative determination is made in step S105, the processing proceeds to step S401. Note that the user terminal 20 in the case where a negative determination is made in step S105 is the second user terminal 20B. In step S401, the control device 31 determines whether or not the position of the second user terminal 20B is within a predetermined distance from the vehicle 10. The predetermined distance is, for example, a distance that can be moved to the vehicle 10 on foot, and is, for example, 1 km. Also, as an alternative, for example, in cases where the vehicle 10 is a company vehicle and is located within the predetermined distance from its company, an affirmative determination may be made in step S402. The position of the company has been registered in the server 30 in advance. When an affirmative determination is made in step S402, the processing proceeds to step S106, whereas when a negative determination is made, the processing proceeds to step S109.

In this way, the position information of the vehicle 10 is also provided to the second user under the condition, so that the convenience of the user can be enhanced. The condition for providing the position information of the vehicle 10 to the second user may be determined by the first user, or may have been stored in the server 30 in advance.

Other Embodiments

The above-described embodiments are merely examples, but the present disclosure can be implemented with appropriate modifications without departing from the spirit thereof.

The processing and/or means (devices, units, etc.) described in the present disclosure can be freely combined and implemented as long as no technical contradiction occurs.

The processing described as being performed by one device or unit may be shared and performed by a plurality of devices or units. Alternatively, the processing described as being performed by different devices or units may be performed by one device or unit. In a computer system, a hardware configuration (server configuration) for realizing each function thereof can be changed in a flexible manner. For example, the vehicle 10 may have a part or all of the functions of the server 30.

The present disclosure can also be realized by supplying to a computer a computer program in which the functions described in the above-described embodiments are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, or any type of medium suitable for storing electronic commands or instructions.

What is claimed is:

1. An information processing apparatus comprising a controller configured to perform:

identifying a first user who is a user using a vehicle associated with a plurality of users;

transmitting, to a terminal of the first user, information about a parking position of the vehicle when the vehicle is parked, and not transmitting the information about the parking position of the vehicle to a terminal of a second user, who is a user other than the first user among the plurality of users; and transmitting the information about the parking position of the vehicle to the terminal of the second user when the terminal of the second user exists within a predetermined range from the vehicle.

2. The information processing apparatus according to claim 1, wherein the controller is configured to identify, as the first user, a user associated with an electronic key used for using the vehicle at the time when the vehicle was parked.

3. The information processing apparatus according to claim 1, wherein the controller is configured to identify, as the first user, a user associated with a user terminal present in the vehicle at the time when the vehicle was parked.

4. The information processing apparatus according to claim 1, wherein the controller is configured to identify, as the first user, a user associated with an electronic key when the vehicle was operated by the electronic key.

5. The information processing apparatus according to claim 1, wherein the controller is configured to reset information about the first user at the time of starting the vehicle.

6. The information processing apparatus according to claim 1, wherein the controller is configured to:

obtain, from the vehicle, information about position information of the vehicle and the user using the vehicle; and receive a request for confirming the position of the vehicle from a terminal of the user using the vehicle.

7. An information processing method for causing a computer to perform:

identifying a first user who is a user using a vehicle associated with a plurality of users;

transmitting, to a terminal of the first user, information about a parking position of the vehicle when the vehicle is parked, and not transmitting the information about the parking position of the vehicle to a terminal of a second user, who is a user other than the first user among the plurality of users; and transmitting the information about the parking position of the vehicle to the terminal of the second user when the terminal of the second user exists within a predetermined range from the vehicle.

8. The information processing method according to claim 7, wherein the method causes the computer to identify, as the first user, a user associated with an electronic key used for using the vehicle at the time when the vehicle was parked.

9. The information processing method according to claim 7, wherein the method causes the computer to identify, as the first user, a user associated with a user terminal present in the vehicle at the time when the vehicle was parked.

10. The information processing method according to claim 7, wherein the method causes the computer to identify, as the first user, a user associated with an electronic key when the vehicle was operated by the electronic key.

11. The information processing method according to claim 7, wherein the method causes the computer to reset information about the first user at the time of starting the vehicle.

12. The information processing method according to claim 7, wherein the method causes the computer to:

obtain, from the vehicle, information about position information of the vehicle and the user using the vehicle; and receive a request for confirming the position of the vehicle from a terminal of the user using the vehicle.

13. A system comprising:

a server;

a vehicle associated with a plurality of users; and a terminal associated with each of the plurality of users, wherein the server includes a controller configured to perform:

identifying a first user, who is a user using the vehicle, based on information transmitted from the vehicle to the server;

transmitting, to a terminal of the first user, information about a parking position of the vehicle when the vehicle is parked, and not transmitting the information about the parking position of the vehicle to a terminal of a second user, who is a user other than the first user among the plurality of users; and transmitting the information about the parking position of the vehicle to the terminal of the second user when the terminal of the second user exists within a predetermined range from the vehicle.

14. The system according to claim 13, wherein the controller is configured to identify, as the first user, a user associated with an electronic key used for using the vehicle at the time when the vehicle was parked.

15. The system according to claim 13, wherein the controller is configured to identify, as the first user, a user associated with a user terminal present in the vehicle at the time when the vehicle was parked.

16. The system according to claim 13, wherein the controller is configured to identify, as the first user, a user associated with an electronic key when the vehicle was operated by the electronic key.

17. The system according to claim 13, wherein the controller is configured to reset information about the first user at the time of starting the vehicle.

* * * * *